US011964411B2

(12) United States Patent
Enggist et al.

(10) Patent No.: US 11,964,411 B2
(45) Date of Patent: Apr. 23, 2024

(54) METHOD AND SYSTEM FOR MANUFACTURING AT LEAST ONE TIMEPIECE ELEMENT INTENDED TO BE MOUNTED ON A TIMEPIECE COMPONENT OF A TIMEPIECE

(71) Applicant: ETA SA Manufacture Horlogere Suisse, Grenchen (CH)

(72) Inventors: Yann Enggist, Ins (CH); Marc Schlappach, Zofingen (CH); Frédéric Jeanrenaud, La Chaux-de-Fonds (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 806 days.

(21) Appl. No.: 16/975,272

(22) PCT Filed: Mar. 20, 2019

(86) PCT No.: PCT/EP2019/056986
§ 371 (c)(1),
(2) Date: Aug. 24, 2020

(87) PCT Pub. No.: WO2019/185422
PCT Pub. Date: Oct. 3, 2019

(65) Prior Publication Data
US 2020/0398465 A1 Dec. 24, 2020

(30) Foreign Application Priority Data
Mar. 29, 2018 (EP) .................................... 18165061

(51) Int. Cl.
*B29C 45/00* (2006.01)
*B29C 45/14* (2006.01)
(Continued)

(52) U.S. Cl.
CPC .......... *B29C 45/0053* (2013.01); *B29C 45/14* (2013.01); *B29C 45/40* (2013.01);
(Continued)

(58) Field of Classification Search
CPC ................................................. B29L 2031/739
See application file for complete search history.

(56) References Cited

U.S. PATENT DOCUMENTS

2016/0229137 A1\* 8/2016 Burger ................ B29C 45/2675

FOREIGN PATENT DOCUMENTS

| CH | 354028 | 4/1961 |
|----|--------|--------|
| CH | 395 870 | 7/1964 |

(Continued)

OTHER PUBLICATIONS

Combined Chinese Office Action and Search Report dated Jun. 24, 2021 in Chinese Patent Application No. 201980023950.7 (with English translation), 16 pages.

(Continued)

*Primary Examiner* — Jacob J Cigna
(74) *Attorney, Agent, or Firm* — Oblon, McClelland, Maier & Neustadt, L.L.P.

(57) ABSTRACT

A method for manufacturing a timepiece element, such as an applique, to be mounted on a timepiece component, such as a dial of a timepiece, includes producing a blank of the timepiece element from an injection overmoulding of injectable material into a cavity of a mould. The cavity is defined by the association of at least one impression of a first part of the mould with a second part of the mould including an inlet orifice of the cavity for injecting the material into the cavity. The method also includes finishing the timepiece element including applying a coating on the blank of the timepiece element overmoulded on the second part, and withdrawing the finished timepiece element from the second part, which (Continued)

includes breaking an injection point connecting the timepiece element to the second part in preparation for mounting thereof on the timepiece component.

14 Claims, 4 Drawing Sheets

(51) Int. Cl.
 *B29C 45/40* (2006.01)
 *B29C 45/78* (2006.01)
 *B29L 31/00* (2006.01)
 *G04D 3/00* (2006.01)

(52) U.S. Cl.
 CPC ........... *B29C 45/78* (2013.01); *G04D 3/0048* (2013.01); *B29C 2045/0079* (2013.01); *B29C 2945/76531* (2013.01); *B29C 2945/76735* (2013.01); *B29L 2031/739* (2013.01)

(56) References Cited

FOREIGN PATENT DOCUMENTS

| | | | |
|---|---|---|---|
| CH | 557 562 A | 12/1974 | |
| CN | 1683931 A | 10/2005 | |
| CN | 101675174 A | 3/2010 | |
| CN | 102483607 A | 5/2012 | |
| CN | 103930838 A | 7/2014 | |
| CN | 105593005 A | 5/2016 | |
| CN | 107160632 A | 9/2017 | |
| EP | 2 579 108 B1 | 5/2014 | |
| GB | 2027636 A * | 2/1980 | ....... B29C 45/14344 |
| GB | 2 027 636 B | 3/1982 | |

OTHER PUBLICATIONS

International Search Report dated Jul. 3, 2019 in PCT/EP2019/056986 filed on Mar. 20, 2019, 2 pages.

* cited by examiner

METHOD AND SYSTEM FOR MANUFACTURING AT LEAST ONE TIMEPIECE ELEMENT INTENDED TO BE MOUNTED ON A TIMEPIECE COMPONENT OF A TIMEPIECE

CROSS-REFERENCE TO RELATED APPLICATIONS

The present application is a national stage entry of International Application No. PCT/EP2019/056986, filed Mar. 20, 2019, which claims priority to European Patent Application No. 18165061.5, filed on Mar. 29, 2018, the entire content and disclosure of each of the above applications are incorporated by reference herein.

FIELD OF THE INVENTION

The invention relates to a method and a system for manufacturing at least one timepiece element, in particular an applique, intended to be mounted on a timepiece component such as a dial of a timepiece.

The invention also relates to a timepiece element for a timepiece component as well as to said timepiece component comprising at least one timepiece element.

The invention also relates to a timepiece including such a timepiece component.

BACKGROUND OF THE INVENTION

In the prior art, timepiece elements such as appliques provided to be disposed on the dials of watches, are usually produced from methods implementing techniques of tracing, or even of silkscreen or also of dying the lower surface of the dial with the portions in relief forming the appliques that are then in this context polished, varnished, or covered with a luminescent pigment. Said appliques may also be parts mounted on the dial being produced from methods implementing techniques of stamping/machining a metal plate then of gluing, for example by means of a hot-setting adhesive.

When it is desired to obtain high quality parts, the appliques are then usually provided with feet for the fixing thereof on the dial by gluing, welding or also riveting. The appliques are roughed out from methods implementing techniques of machining or stamping in a section, then taken for faceting. However, one of the drawbacks of such methods is related to the fact that same may be the cause of the presence of imperfections on the surfaces of said appliques.

In addition, these different methods often require a great deal of handling on the part of operators, which proves to be long and tedious given the small size of the parts to be handled, particularly the setting in the dial.

SUMMARY OF THE INVENTION

The aim of the present invention is to overcome all or part of the previously mentioned drawbacks by proposing a method and a system for implementing said method making it possible to manufacture high quality timepiece components more rapidly by limiting the manual operations.

To this end, the invention relates to a method for manufacturing at least one timepiece element, in particular an applique, intended to be mounted on a timepiece component such as a dial of a timepiece, said method comprising the steps of:

producing a blank of the timepiece element from an injection overmoulding of injectable material into at least one cavity of a mould relating to the timepiece element to be manufactured, said cavity being defined by the association of at least one impression of a first part of the mould with a second part of said mould comprising an inlet orifice of the cavity for injecting said material into said cavity;

finishing the timepiece element comprising a substep of applying a coating on said blank of said timepiece element overmoulded on the second part, and withdrawing the finished timepiece element from the second part comprising a substep of breaking an injection point connecting said timepiece element to the second part and this, in anticipation of the mounting thereof on the timepiece component.

In other embodiments:

The method comprises a step of developing the impression from an original part relating to the timepiece element having to be manufactured;

the development step comprises a substep of designing said original part implemented from a lithography technique;

said lithography technique is chosen from the following techniques: ultra-violet projection optical lithography, DUV (Deep Ultra-Violet) projection optical lithography, immersion lithography, double exposure lithography, extreme ultra-violet lithography, nanoprinting lithography;

the development step comprises a substep of replicating the original part aiming to produce the impression by reproducing a negative form of the original part implementing Ni shims or BMG replication techniques;

the step of producing a blank of the timepiece element comprises a substep of forming the mould by mutually assembling first, second and third parts;

the step of producing a blank of the timepiece element comprises a substep of injection overmoulding the injectable material into the cavity of the mould;

the overmoulding substep comprises a phase of injecting the injectable material into the cavity;

the overmoulding substep comprises a phase of controlling the temperature of said mould in particular during a period extending from before the start of the phase of injecting injectable material into the cavity to the end of said material injection phase or even after said injection phase;

the overmoulding substep comprises a phase of placing under a vacuum said cavity before the phase of injecting the injectable material into said cavity, and the step of finishing the timepiece element comprises a substep of applying a coating on said blank of said timepiece element overmoulded on the second part providing for a phase of depositing decorative and/or functional material on the visible outer face of said blank.

The invention also relates to a system for manufacturing at least one timepiece element implementing such a method comprising:

a mould provided with at least one cavity formed by the assembly of a first and of a second part of the mould, the cavity contributing to the production of a blank of the timepiece element from an injection overmoulding of injectable material on the second part;

a device for applying a coating on said blank overmoulded on the second part contributing to the finishing of the timepiece element, and a device for extracting the finished timepiece element from the mould.

The invention also relates to a timepiece element for a timepiece component likely to be obtained from said method.

Furthermore, the invention relates to said timepiece component for a timepiece comprising at least one such timepiece element likely to be obtained from said method.

The invention also relates to a timepiece comprising such a timepiece component.

BRIEF DESCRIPTION OF THE DRAWINGS

Other specific features and advantages will become clearly apparent from the following description made hereafter, by way of indicative and non-limiting example, with reference to the appended drawings, wherein.

DETAILED DESCRIPTION OF PREFERRED EMBODIMENTS

Figure 1:
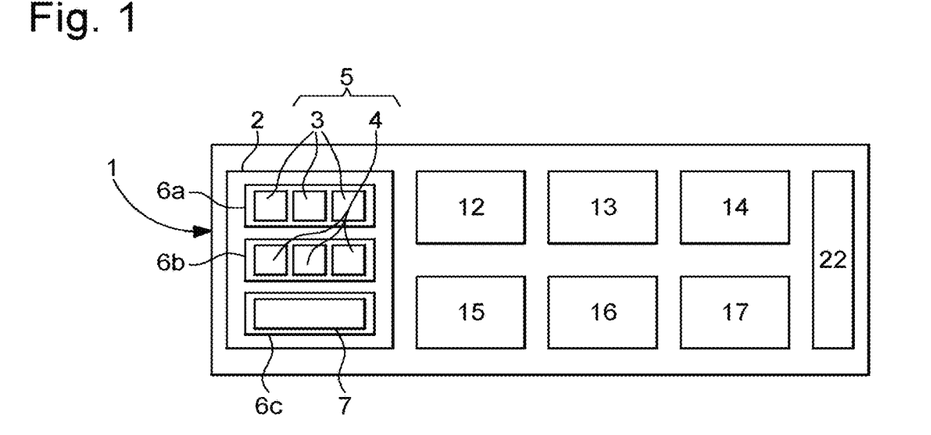
FIG. 1 is a representation of a system for manufacturing at least one timepiece element, in particular an applique, intended to be mounted on a timepiece component such as a dial of a timepiece, according to one embodiment of the invention.

With reference to FIG. 1, the invention relates to a system for manufacturing 1 at least one timepiece element 10b, in particular an applique, intended to be mounted on/in a timepiece component 110 such as a dial of a timepiece 100. Such a system 1 is capable of being implemented within an automatic assembly installation (or automatic assembly line) dedicated to the manufacturing of all or part of a timepiece 100. In this context, said system 1 contributes to manufacturing and to providing the distribution of timepiece elements within said automatic assembly installation.

It will be noted in a non-limiting and non-exhaustive manner that said timepiece element 10b may be an applique, an insert, an index or also a train element, etc. Furthermore, concerning the timepiece component 110, said latter may be a dial, a mechanism of a horological movement, a flange or also a bezel, etc.

Such a system 1 comprises in a non-limiting and non-exhaustive manner:
- a mould 2 formed by the reversible assembly of three parts mutually connected:
  - a first part 6a comprising at least one impression 3 relating to the timepiece element 10b to be manufactured;
  - a second part 6b comprising a support plate of each timepiece element 10b manufactured, and
  - a third part 6c having the form of a plate.
    - a device for injecting 12 an injectable material into said mould 2;
    - a device for applying 13 a coating on a blank of the timepiece element 10b overmoulded on the second part 6b;
    - a device for designing 14 an original part also called "master" relating to the timepiece element 10b to be manufactured, in particular implementing lithography techniques particularly of ultra-violet projection optical lithography, DUV (Deep Ultra-Violet) projection optical lithography, immersion lithography, double exposure lithography, extreme ultra-violet lithography and/or nanoprinting lithography;
    - a device for developing 15 the impression 3 from the original part in particular implementing Ni shims or BMG replication techniques;
    - a device for placing under a vacuum 16 said mould 2 and/or a device for controlling 17 the temperature within the mould 2, and
    - a device for extracting 22 the timepiece element 10b from the mould 2 in particular the second part 6b of said mould 2.

Figure 2:
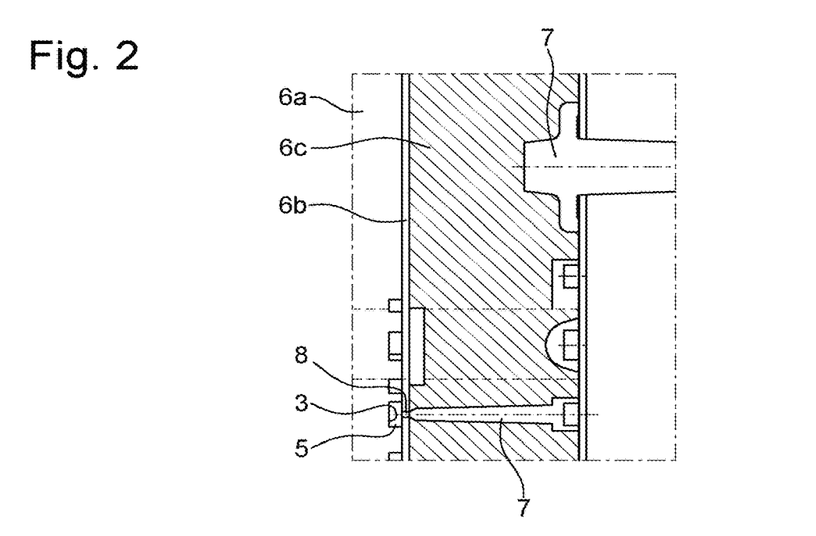
FIG. 2 is a sectional view of a portion of a mould of the system, according to one embodiment of the invention.

In FIGS. 1 and 2, in said mould 2, the assembly of the first part 6a with the second part 6b defines at least one cavity 5 of the mould 2. Said first part 6a of the mould 2 comprises an inner face that may be provided with a single impression 3 or also a plurality of impressions 3 each relating to a timepiece element 10b to be manufactured. Said impressions 3 comprise a hollow shape defined in said flat inner face of the first part 6a. It will be noted that in said configuration, said mould 2 comprises as many cavities 5 as said first part 6a includes impressions 3.

In this context, when the system 1 is provided with the device for controlling 17 the temperature within said mould 2, the first part 6a may then comprise a circuit defined in the body of said first part 6a that is essentially arranged below each impression 3. Such a circuit is mounted on the device for controlling 17 the temperature that is then capable of generating the circulation of a cooling fluid or heating fluid in said circuit.

In addition, it will be noted that the second part 6b comprises an inner face comprising an area 4 defined for forming with said impression 3 said cavity 5 wherein cavity 5 the injectable material is injected and this, so as to contribute to the design of said blank 10a of the timepiece element 10b. Said cavity 5 defines the final shape of the timepiece element 10b that is both produced by the impression 3 but also by the corresponding area 4 of the inner face of the second part 6b which is then arranged facing said impression 3 when the first and second parts 6bs are assembled with one another.

In said mould 2, said second part 6b is preferably a plate of low thickness having inner and outer faces that are flat. The inner face of said second part 6b is intended to be in contact with the inner face of the first part 6a when said first and second parts 6a, 6b are assembled with one another. The thickness of said second part 6b is preferably lower than same of the first and third parts 6a, 6c of said mould 2. Such a second part 6b is arranged in said mould 2 by being sandwiched between the first and third parts 6a, 6c. Said second part 6b also comprises at least one through channel 8 mutually connecting the inner and outer faces thereof, each through channel 8 comprising a first end leading into each corresponding cavity 5 of the mould 2 and a second end leading into the outer face of said second part 6b. It is understood that the second part 6b comprises at least as many through channels 8 as the mould 2 comprises cavities 5.

In addition, it will be noted that said second part 6b also contributes to the handling of said blank 10a of the timepiece element 10b during the production of various steps resulting in the manufacture of said timepiece element 10b in particular during the application of the coating on said latter. And finally, said second part 6b also contributes to the handling of the timepiece element 10b in anticipation of the mounting thereof on the timepiece component 110.

As previously mentioned, said mould 2 also comprises a third part 6c that is provided in order to be assembled on the outer face of the second part 6b. Said third part 6c comprises at least one circuit for injecting 7 injectable material connected in a first end to the injection device 12 and in a second end to each through channel 8 of the second part 6b. It will be noted that when the system 1 is provided with the device for placing under a vacuum 16 said mould 2, the third part 6c may then comprise a vacuum circuit defined in the body of said third part 6c and that is connected at one end to each through channel 8 of the second part 6b as well as at the other end to said vacuum device 16 capable of causing an air space in each cavity 5 of the mould 2. In said configuration, it is understood that one of the functions of the third part 6c is to provide the transport of the injectable material towards the material injection through channel 8 and to contribute if applicable to placing under a vacuum the cavity 5 of the mould 2.

With reference to FIGS. 4A to 7, when said timepiece element 10b is an applique same may comprise at least one foot 21 or on the contrary be devoid thereof. When the timepiece element 10b is devoid of a foot 21, the cavity 5 is formed by the assembly of an impression 3 included in the inner face of the first part 6a with the corresponding area 4 of the inner face of the second part 6b. In this context, said corresponding area 4 of the inner face of the second part 6b that contributes to the formation of said cavity 5 comprises an inlet orifice 9 of the injectable material in said cavity 5. Said inlet orifice 9 forms the first end of the through channel 8 provided in the second part 6b that leads into the cavity 5 and whereof the second end is connected to the device for injecting 12 injectable material via an injection circuit 7 defined in the third part 6c.

When the timepiece element 10b comprises at least one foot 21, the cavity 5 is formed by the assembly of an impression 3 included in the inner face of the first part 6a with the corresponding area 4 of the inner face of the second part 6b provided with at least one housing provided for the formation of said at least one foot 21. Said inner face of the second part 6b comprises as many housings as the timepiece element 10b includes feet 21. A housing provided in the inner face of the second part 6b corresponds to a blind hole or also to a hole including in the base thereof the single inlet orifice 9 of the injectable material in the cavity 5. As previously mentioned, said inlet orifice 9 forms the first end of the through channel 8 provided in the second part 6b that leads into the cavity 5 and whereof the second end is connected to the device for injecting 12 injectable material via an injection circuit 7 defined in the third part 6c. It will be noted that said configuration, when the cavity 5 comprises one or more housings corresponding to blind holes, the inlet orifice 9 is then defined in a corresponding area 4 of the inner face of the second part 6b of course devoid of such housings.

Figure 4A:
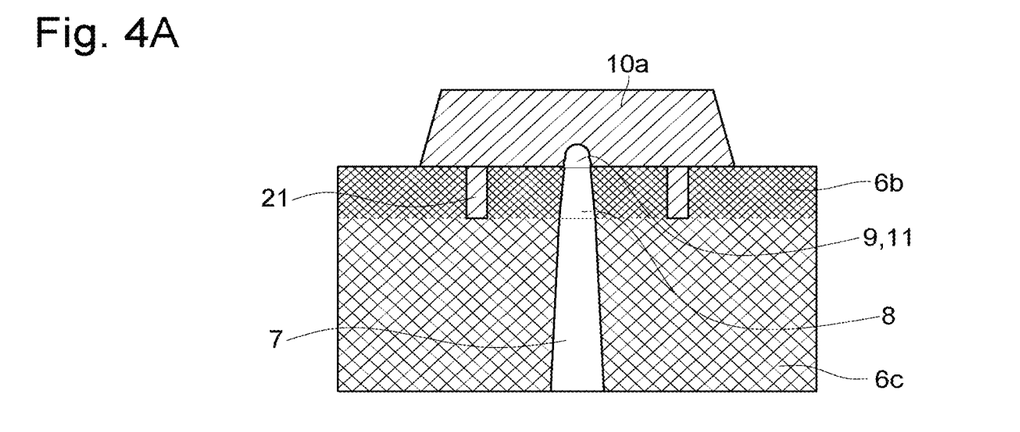
FIGS. 4A, 4B and 4C are sectional views of various variants of timepiece element blanks overmoulded on a second part of the mould of the system forming a support plate of said blanks, according to one embodiment of the invention.
Figure 4B:
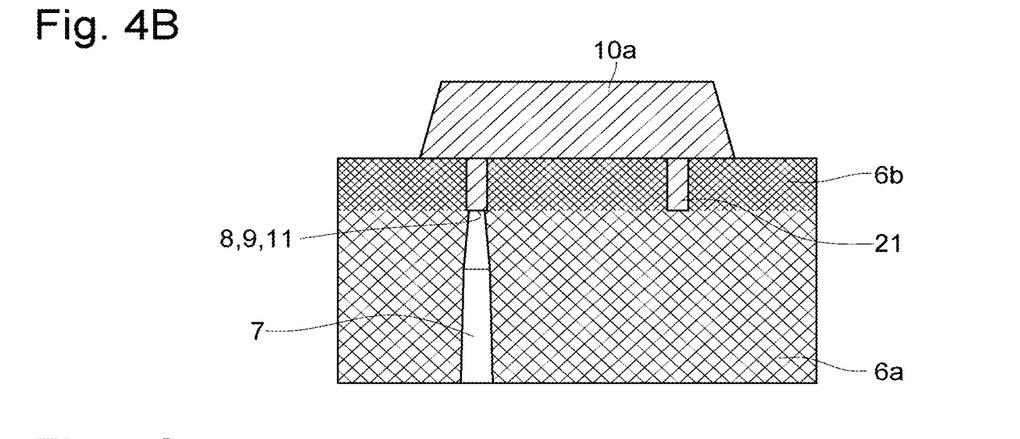
Figure 4C:
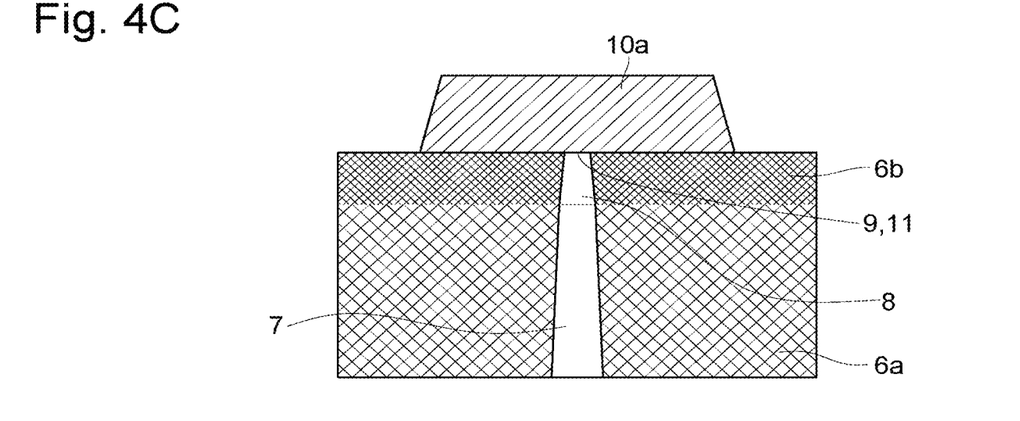
Figure 5:
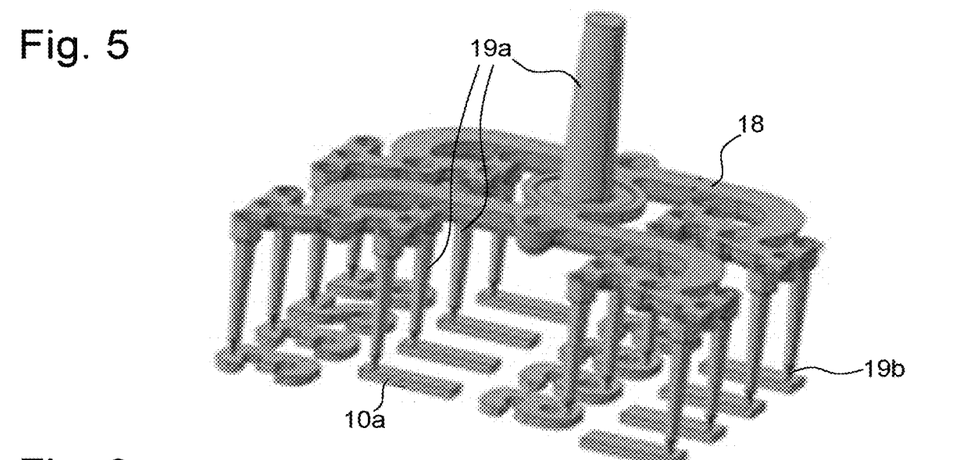
FIG. 5 is a view of the timepiece element blanks all connected to a sprue formed essentially by a third part of the mould not shown here just like the second part of the mould on which said blanks are supported for better understanding of the invention, according to one embodiment of said invention.
Figure 6:
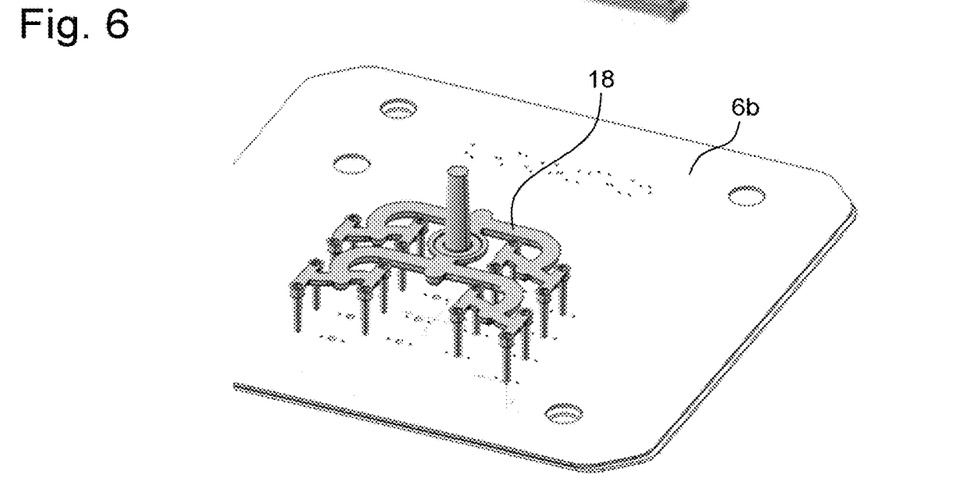
FIG. 6 is a view of the sprue comprising the timepiece element blanks overmoulded on the second part, according to one embodiment of the invention.
Figure 7:
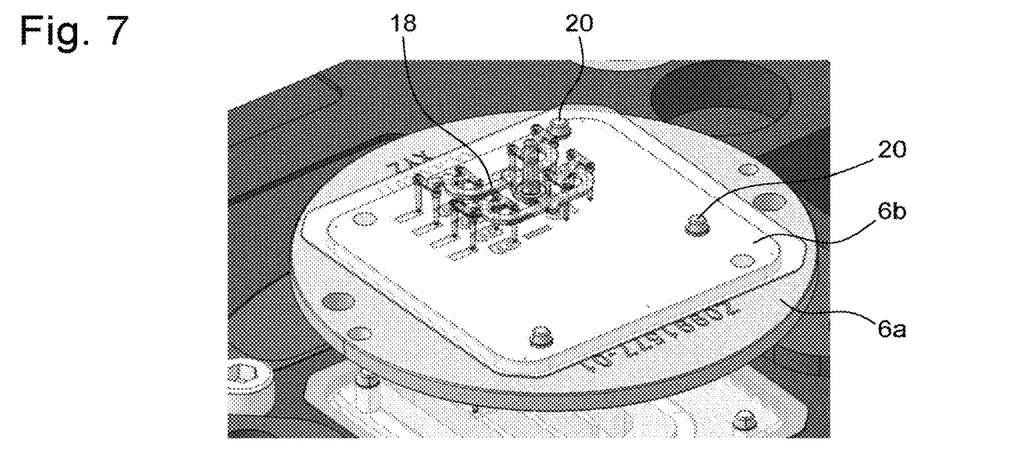
FIG. 7 is a view of the first and second parts of the mould assembled together without the third part, according to one embodiment of the invention.

It will be noted that the portion of injectable material that is solidified in the inlet orifice 9 of the cavity 5 forms an injection point 11 that is defined in order to be broken in particular during the separation of the timepiece element 10b manufactured from the second part 6b as subsequently described. Indeed, said injection point 11 provides the holding of the timepiece element 10b manufactured on the second part 6b by connecting same to a sprue 18 formed in said mould 2. It will be noted that said sprue 18 comprises a first portion 19b formed by the solidification of the injectable material in the through channel and/or the inlet orifice of the cavity 5, and a second portion 19a formed by the solidification of the injectable material in the injection circuit provided in the third part 6c.

With reference to FIG. 4A, it will be noted that when the cavity 5 is defined to form a timepiece element 10b comprising at least one foot 21 with an inlet orifice 9 included in the base of the housing provided for the formation of said foot 21, the through channel 8 is combined with said inlet orifice 9.

Furthermore, in said configuration, it is clearly understood that the impression 3 forms the visible portion of the timepiece element 10b such as an applique when same is mounted on a dial and the corresponding area 4 of the second part 6b forming for its part the connecting portion of said applique with the dial from the feet of said applique or from an invisible face of said latter.

In said system 1, the device for applying 13 a coating on a blank 10a of the timepiece element 10b overmoulded on the second part 6b is capable of applying/depositing a coating comprising a decorative material of metal type and/or a functional material on the outer surface of the blank 10a of the timepiece element 10b. Such a device 13 may comprise a printing module provided in particular with a component for ejecting said decorative and/or functional material, and/or a component for pulverizing such a material and/or a component for pulverizing a film comprising such a material. It will be noted that the pulverization component may be a direct current cathodic pulverization component or also a High Power Impulse Magnetron Sputtering component better known under the acronym HIPIMS. It will be noted that other techniques may be implemented such as same known as "hot transfer" of the coating on the blank.

In said system 1, the decorative material may be made of an ink, or also of a metal or of a metal alloy. Said decorative material contributes to modifying the aesthetic aspect of the timepiece element 10b by being applied on the blank 10a of said timepiece element 10b. Concerning the functional material, same aims to give the timepiece element 10b physical and/or chemical functional features related for example to:

the electric conductivity, semi-conductive or insulating character;
the semi-conductivity;
the electroluminescence;
the photoluminescence (for example a reaction to ultra-violet radiation);
the phosphorescence;
"X-chromism" (photochrome, electrochrome, thermochrome, ionochrome, mechanochrome, etc.);
the electroactivation;
the magnetism;
etc.

In said system 1, the injectable material used is for example an organic and/or composite material, or a metallic or ceramic material or also a thermodeformable, thermosettable, or thermoplastic material. By way of examples said material may comprise the following elements:
SLN (phosphorescent) type filled plastic and colour and/or fluorescent pigments;
ceramic filled polymer with and without colour pigment;
additive making it possible to give a metallic/shiny aspect, aluminium powder type, metallic powder;
additive making it possible to make the polymer conductive (for technical reasons or for a chemical/galvanic post-treatment or other);
additive giving an aesthetic finish reproducing a material (mother-of-pearl, stone, etc.);
additive giving particular mechanical and/or tribological features;
Bulk Metallic Glass better known under the acronym "BMG";
rust-proof material;
sinterable metal material;
ceramic;
silicium, and/or
combination of one or other of said elements with one another or a plurality of said latter with one another.

In said configuration, it is clearly understood that such a system 1 makes it possible to manufacture a plurality of timepiece components 110 simultaneously with a first part 6a then comprising a plurality of impressions 3 and being capable of contributing with in particular the second part 6b to the obtaining of a series of timepiece components 110 overmoulded on said second part 6b. By being thus overmoulded on the same second part 6b, said timepiece components 110 may be easily distributed in the automatic assembly installation of all or part of a timepiece 100. Alternatively, it is clearly understood that the first part 6a may comprise a single impression 3 relating to the timepiece element 10b to be manufactured.

Moreover, it will be noted that the second part 6b and the first part 6a may comprise at least one element for positioning 20 (visible in FIG. 6) said second part 6b relatively to said first part 6a so as to provide the positioning of the corresponding area 4 of the second part 6b facing the corresponding impression 3.

Figure 3:
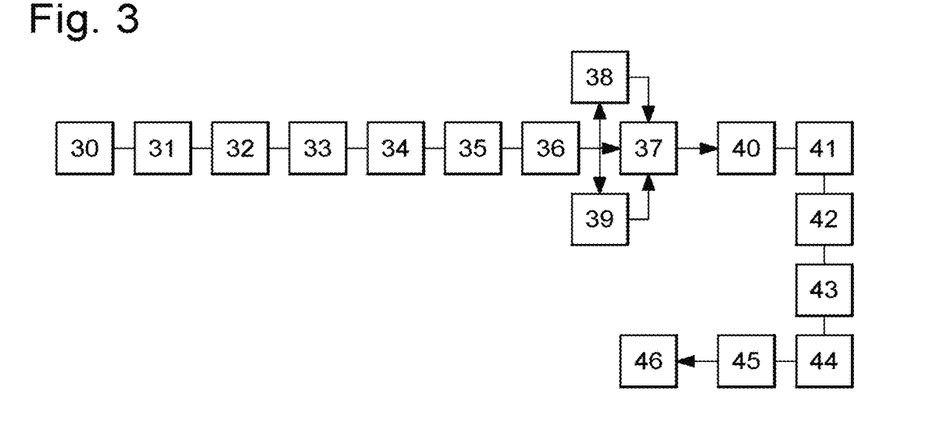
FIG. 3 is a flow chart relating to a method for manufacturing at least one timepiece element, in particular the applique, intended to be mounted on the timepiece component such as a dial of a timepiece, according to one embodiment of the invention.

With reference to FIG. 3, said system 1 implements a method for manufacturing at least one timepiece element 10b, in particular an applique, intended to be mounted on a timepiece component 110 such as a dial of a timepiece 100.

Such a method comprises a step of developing 30 the impression 3 in a first part 6a from an original part relating to the timepiece element 10b having to be manufactured. It is understood that said step 30 is capable of contributing to the production of as many impressions 3 as there are timepiece elements 10b to be manufactured and this, so that such impressions 3 are included on a first part 6a. Said step 30 provides for the production of an impression 3 from an original part otherwise called "master". Said original part has a shape similar to same of the timepiece element 10b having to be manufactured. It will be noted that the implementation of said step 30 may require as many original parts as there are impressions 3 to be produced.

In this context, the development step 30 comprises a substep of designing 31 said original part implemented from a lithography technique. Said lithography technique is chosen from the following techniques known from the prior art and that are not described in more detail here: ultra-violet projection optical lithography, DUV (Deep Ultra-Violet) projection optical lithography, immersion lithography, double exposure lithography, extreme ultra-violet lithography, nanoprinting lithography.

Said development step 30 subsequently comprises a substep of replicating 32 the original part aiming to produce the impression 3 by reproducing a negative form of the original part. Said substep 32 particularly provides for the implementation of replication techniques of the Ni shims or BMG (acronym for "Bulk Metallic Glass") type known from the prior art and that are not described in more detail here.

Subsequently, the method comprises a step of producing 33 a blank 10a of the timepiece element 10b from an injection overmoulding of injectable material into at least one cavity 5 of the mould 2. It will be noted that such a cavity 5 is defined for the development/the formation of the timepiece element. In other words, said cavity 5 of the mould 5 being formed by the association of at least one impression of the first part 6a of the mould 5 with a second part 6b of said mould 5, defines a space corresponding to the volume and to the shape of the timepiece element that is produced here. Said production step 33 comprises a substep of forming 34 the mould 2 by mutually assembling first, second and third parts 6a, 6b, 6c. Said substep 34, provides for a phase of reversible assembly 35 of the third part 6c with the second part 6b that is itself assembled with the first part 6a. Said assembly is produced so as to form the cavity or cavities 5 of the mould 2 and also to provide an optimum connection between the injection circuit 7 provided in the third part 6c and the through channel or through channels 8 defined in the second part 6b.

Said step 33 subsequently comprises a substep of injection overmoulding 36 the injectable material into the cavity 5 included in the mould 2. Said substep 36 aims to produce an overmoulding of the blank 10a of the timepiece element 10b on the corresponding area 4 of the inner face of the second part 6b. Said substep 36 comprises a phase of injecting 39 into said cavity 5 the injectable material coming from the device for injecting 12 said material. In this context, the injectable material coming from the injection device 12 is introduced into the cavity 5 by passing through the circuit for injecting 7 injectable material defined in the third part 6c and the through channel 8 included in the second part 6b connecting said injection circuit 7 to said cavity 5. Thus, the injectable material then comes to occupy the entire volume defined in the cavity 5 by overmoulding the corresponding area of the inner face of the second part 6b arranged facing the impression 3 in view of forming said blank 10a of the timepiece element 10b.

Such an overmoulding substep 36 may comprise the following phases:
a phase of placing under a vacuum 37 said cavity 5 before the production of the phase of injecting 39 the injectable material into said cavity 5, and/or
a phase of controlling the temperature 38 of said cavity 5 in particular during a period extending from before the start of the phase of injecting 39 injectable material into the cavity 5 to the end of said material injection phase 39 or even after said injection phase 39.

Such phases of placing under a vacuum 37 and of controlling the temperature 38 aim to provide a structural homogeneity of the blank 10*a* of the timepiece element 10*b* during the overmoulding thereof on the second part 6*b* in order to eliminate the presence of any defect likely to be present on the visible outer face of said blank 10*a*. Such a defect may for example reside in the presence of a weld line on the visible outer face of the blank 10*a*, formed following the joining of two flow streams of injectable material into the cavity 5. Such a weld line is often present on blanks 10*a* of timepiece elements 10*b* relating to appliques having the shape of a numeral 6, 8 or also 0.

During the implementation of the phase of placing under a vacuum 37, the fluid present in the cavity 5 for example a gas such as air is then evacuated from the cavity 5 before the production of the injection phase.

During the production of the phase of controlling the temperature 38 of the cavity 5, the temperature of the cavity 5 is then brought to a temperature that is greater or substantially greater than the temperature of the injectable material coming from the device for injecting 12 said material and this, before the production of the injection phase. Subsequently, once the phase of injecting 39 the injectable material has been produced that is to say completed, the cavity 5, is immediately cooled.

The method subsequently comprises, a step of finishing 40 the timepiece element 10*b* comprising a substep of applying 41 a coating on said blank 10*a* of said timepiece element 10*b* overmoulded on the second part 6*b*. In other words, such a step is a step of finishing 40 the timepiece element 10*b* comprising a substep of applying 41 a coating on said blank 10*a* of said timepiece element 10*b* overmoulded on the second part 6*b* after withdrawing beforehand the first part 6*a* from the second part 6*b*. More specifically, said substep 41 comprises a phase of disassembling/withdrawing 42 the first part 6*a* from the second part 6*b* and a phase of depositing 43 the decorative and/or functional material on the visible outer face of the blank 10*a* of the timepiece element 10*b* overmoulded on said second part 6*b*. By way of example, said deposition phase may provide for the application on said outer face of the blank 10*a* of a decorative material comprising a metal composition. Such as deposition phase may then be produced according to a technology implementing a direct current cathodic pulverization component or also a High Power Impulse Magnetron Sputtering component better known under the acronym HIPIMS.

Figure 8:
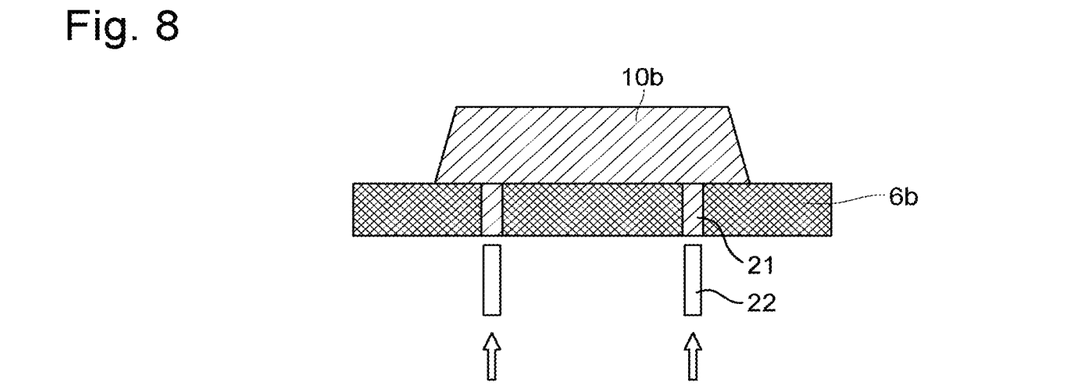
FIG. 8 shows the timepiece element such as an applique comprising two fixing feet and that is supported on the second part of the mould, according to one embodiment of the invention.
Figure 9:
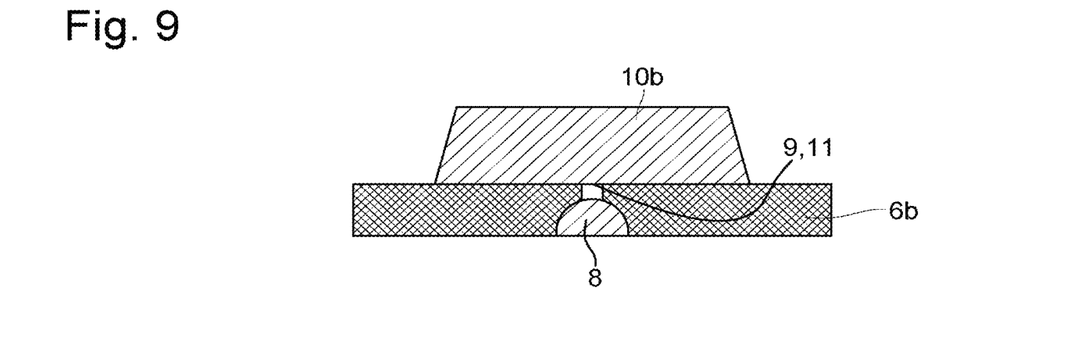
FIG. 9 shows the timepiece element such as an applique devoid of fixing feet and that is supported on the second part of the mould, according to one embodiment of the invention.
Figure 10:
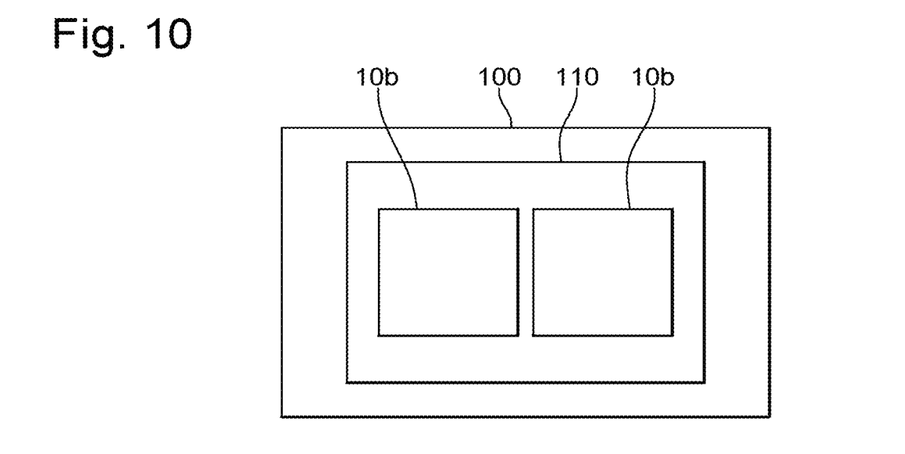
FIG. 10 shows a timepiece comprising a timepiece component provided with at least one timepiece element, according to one embodiment of the invention.

The method subsequently provides for a step of withdrawing 44 the timepiece element 10*b* from the second part 6*b*. Said step 44 comprises a substep of breaking 45 the injection point 11 connecting said timepiece element 10*b* to the second part 6*b* and this, in anticipation of the mounting thereof on the timepiece component 110. Said step 44 comprises a substep of applying 46 a force on the second part 6*b* and/or on the timepiece element 10*b* aiming to cause a rotational or translational movement of said timepiece element 10*b* relatively to the second part 6*b*. By way of example, with reference to FIGS. 8 and 9, when the timepiece element 10*b* is an applique, the force is then applied on the feet 21 of said applique from an extractor of the extraction device 22 in order to cause the translational movement thereof in relation to the second part 6*b*. If said applique is devoid of feet 21, the force is then applied on the visible face of the timepiece element 10*b* in order to generate the rotational movement thereof in relation to the second part 6*b* and to cause the injection point to break.

Once the timepiece element 10*b* has been extracted from said second part 6*b*, then said latter is mounted on the timepiece component 110. When said timepiece element 10*b* is an applique and the component a dial, said latter may comprise openings capable of cooperating with the feet 21 of the applique for the mounting thereof on said dial. The fixing of the feet in said openings may be produced using an adhesive in particular an adhesive that is capable of providing said fixing for example by changing state when exposed to techniques relating:

to the photosensitivity;
to a heat input;
to a reaction to the humidity in the air;
to an anaerobic situation.

If said applique is devoid of feet 21 same is then fixed on said dial at the corresponding location using for example said hot melt adhesive.

The invention claimed is:

1. A method of manufacturing at least one timepiece element to be mounted on a timepiece component, said method comprising:
   forming a mould by assembling a first part, a second part, and a third part, the second part being positioned directly between the first part and the third part;
   producing a blank of the timepiece element from an injection overmoulding of injectable material into at least one cavity of the mould defined for development of the timepiece element to be manufactured, said cavity being defined by an association of at least one impression of the first part of the mould with the second part of said mould, said second part comprising a channel including an inlet orifice of the cavity for injecting said material into said cavity, the third part including an injection circuit extending through a thickness of the third part, the injection circuit being aligned with the channel such that the material travels through the injection circuit and the channel before reaching the inlet orifice of the cavity;
   finishing the timepiece element comprising applying a coating on said blank of said timepiece element overmoulded on the second part, said applying comprising a phase of disassembling/withdrawing the first part from the second part; and
   withdrawing the finished timepiece element from the second part comprising breaking an injection point connecting said timepiece element to the second part in preparation for the mounting thereof on the timepiece component.

2. The manufacturing method according to claim 1, wherein the producing the blank of the timepiece element comprises forming the mould by mutually assembling the first, second and third parts.

3. The manufacturing method according to claim 1, wherein the finishing the timepiece element comprises applying a coating on said blank of said timepiece element overmoulded on the second part providing for a phase of depositing decorative and/or functional material on a visible outer face of said blank.

4. A system for manufacturing at least one timepiece element implementing the manufacturing method according to claim 1, comprising:
   a mould provided with at least one cavity formed by assembling a first and of a second part of the mould, the cavity contributing to the production of a blank of the timepiece element from an injection oveuunoulding of injectable material on the second part;

an application device configured to apply a coating on said blank overmoulded on the second part contributing to the finishing of the timepiece element, and an extraction device configured to extract the finished timepiece element from the mould.

5. The manufacturing method according to claim 1, wherein the at least one timepiece element is an applique.

6. The manufacturing method according to claim 1, wherein the timepiece component is a dial of a timepiece.

7. The manufacturing method according to claim 1, further comprising developing the impression from an original part relating to the timepiece element having to be manufactured.

8. The manufacturing method according to claim 7, wherein the developing comprises replicating an original part to produce the impression by reproducing a negative form of the original part implementing Ni shims or BMG replication techniques.

9. The manufacturing method according to claim 7, wherein the developing comprises designing said original part implemented from a lithography technique.

10. The manufacturing method according to claim 9, wherein said lithography technique is chosen from the following techniques: ultra-violet projection optical lithography, DUV projection optical lithography, immersion lithography, double exposure lithography, extreme ultra-violet lithography, nanoprinting lithography.

11. The manufacturing method according to claim 1, wherein the producing the blank of the timepiece element comprises injection overmoulding the injectable material into the cavity of the mould.

12. The manufacturing method according to claim 11, wherein the injection overmoulding includes a phase of injecting the injectable material into the cavity.

13. The manufacturing method according to claim 12, wherein the injection overmoulding comprises a phase of controlling the temperature of said mould during a period extending from before a start of the phase of injecting injectable material into the cavity to an end of said material injection phase or after said injection phase.

14. The manufacturing method according to claim 12, wherein the injection overmoulding comprises a phase of placing under a vacuum said cavity before the phase of injecting the injectable material into said cavity.

* * * * *